(Model.)
2 Sheets—Sheet 1.
N. MASON.
Geometrical Puzzle Blocks.
No. 232,140. Patented Sept. 14, 1880.
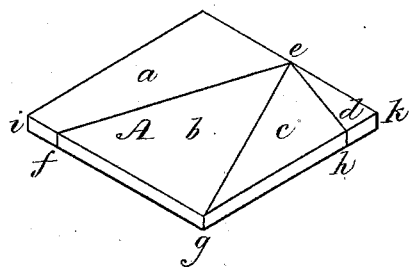
Fig. 1
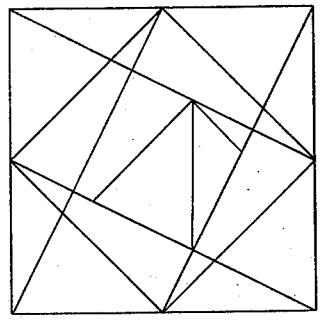
Fig. 2
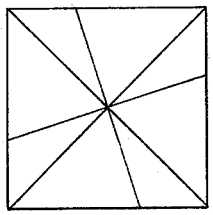
Fig. 3
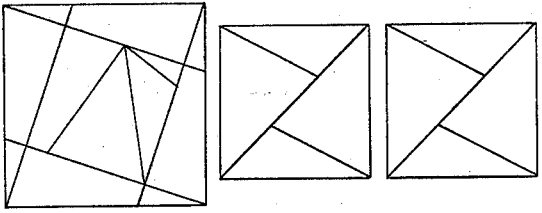
Fig. 4
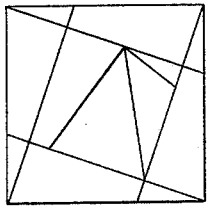
Fig. 5
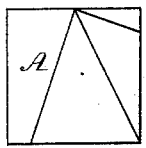 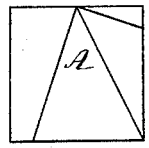 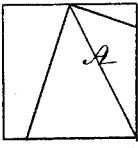 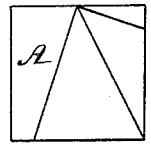 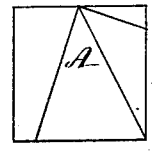
Witnesses:
Chas. E. Griffin
W. J. Cambridge
Inventor,
Nicholas Mason
per P. E. Teschemacher
Atty (Model.)
2 Sheets—Sheet 2.
N. MASON.
Geometrical Puzzle Blocks.
No. 232,140. Patented Sept. 14, 1880.
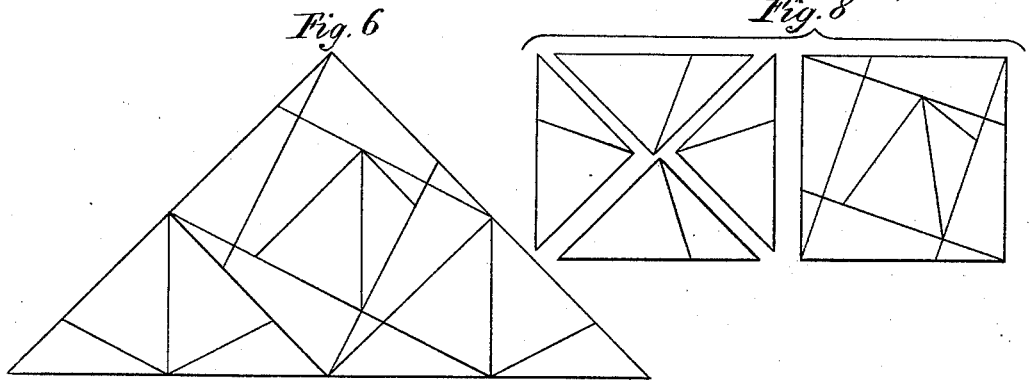
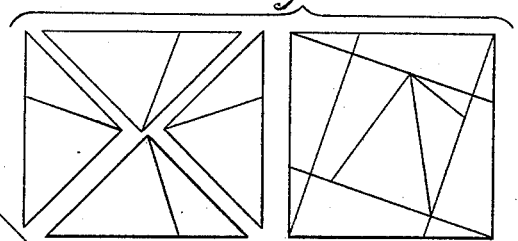
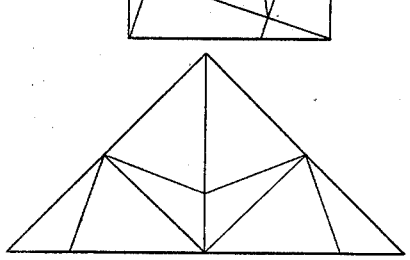
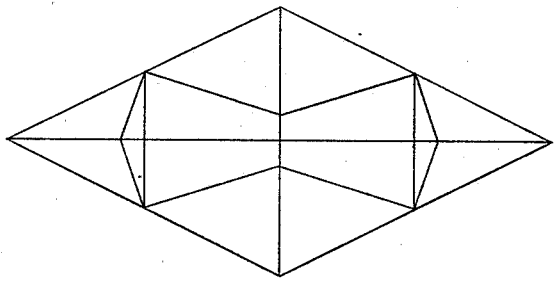
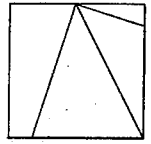
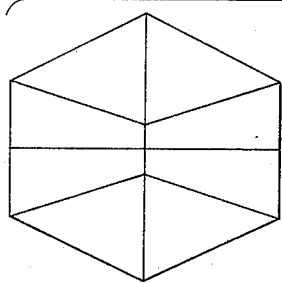
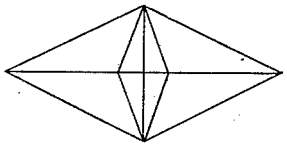
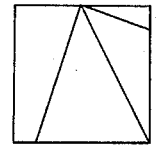
Witnesses,
Chas. E. Griffin.
W. J. Cambridge.
Inventor,
Nicholas Mason
per F. E. Teschemacher
Atty.
N. PETERS, PHOTO-LITHOGRAPHER, WASHINGTON, D. C.

UNITED STATES PATENT OFFICE.

NICHOLAS MASON, OF SOMERVILLE, MASSACHUSETTS.

GEOMETRICAL PUZZLE-BLOCK.

SPECIFICATION forming part of Letters Patent No. 232,140, dated September 14, 1880.

Application filed May 13, 1880. (Model.)

To all whom it may concern:

Be it known that I, NICHOLAS MASON, of Somerville, in the county of Middlesex and State of Massachusetts, have invented an Improvement in a Series of Geometrical Puzzle-Blocks, of which the following is a full, clear, and exact description, reference being had to the accompanying drawings, making part of this specification, in which—

Figure 1 is a perspective view of one of the series of puzzle-blocks, showing the lines on which it is cut or subdivided into sections. Figs. 2, 3, 4, 5, 6, 7, 8, 9, and 10 illustrate a series of geometrical figures which can be produced by combining the several sections composing the five blocks in a variety of different ways.

My invention consists in a puzzle composed of a series of geometrical puzzle-blocks, each of which is subdivided into four sections, three of the sections being in triangular form and the fourth frusto-pyramidal in form, the several sections composing the blocks being capable of being all combined together in different ways, so as to form a variety of different geometrical figures, whereby an exceedingly interesting puzzle is produced for both children and adults.

In the said drawings, A, Fig. 1, represents one of five square pieces or blocks which form the puzzle, these pieces A being all of the same size, and being preferably made of wood of any suitable thickness to admit of their being packed into a box of convenient size. Each piece A is subdivided into four sections, $a\ b\ c\ d$, on the lines $e f$, $e g$, and $e h$, the line $e f$ extending from a point, $e$, at the center of the upper side of the square to a point, $f$, on the opposite side thereof one-sixth of the length of the side from the corner $i$, the line $e g$ extending from the point $e$ to the corner $g$, and the line $e h$ from the point $e$ to a point, $h$, on the right-hand side one-sixth of the length of the side from the corner $k$. Three triangles, $b\ c\ d$, and one trapezoid, $a$, are thus formed from each piece A, and the twenty sections or pieces thus produced from the five square pieces A, Fig. 5, of which the puzzle is composed, can be combined together in a variety of ways, so as to form a single large square, as seen in Fig. 2, or two squares of the same size, as seen in Fig. 3, or three squares, (two of them of the same size,) as seen in Fig. 4, or five squares of the same size, as seen in Fig. 5, or one trangle, as seen in Fig. 6, or one square and one triangle, as seen in Fig. 7, or one square and four triangles of the same size, as seen in Fig. 8, or one diamond and one square, as seen in Fig. 9, or one hexagon, one diamond, and one square, as seen in Fig. 10.

The pieces above described can also be combined to form numerous other figures, if desired.

To produce these several geometrical figures will require much study and the exercise of considerable skill, which renders the puzzle exceedingly interesting and amusing to both children and adults, while it can be furnished at a very trifling cost.

I am aware that a puzzle has been made composed of a series of triangles, as described in the patent of J. U. Mueller, dated February 24, 1863, and I lay no claim to the construction therein shown; but

What I claim as my invention, and desire to secure by Letters Patent, is—

A series of geometrical puzzle-blocks, A, each of which is subdivided on the lines $e f$, $e g$, and $e h$ into four sections, $a\ b\ c\ d$, of the form shown and described, and for the purpose set forth.

Witness my hand this 10th day of May, A. D. 1880.

NICHOLAS MASON.

In presence of—
P. E. TESCHEMACHER,
J. O. GODFREY.